US005233666A

United States Patent [19]

Deveau

[11] Patent Number: 5,233,666

[45] Date of Patent: Aug. 3, 1993

[54] FADER CHANNEL ASSIGNMENT

[75] Inventor: Eddie Deveau, Pompano Beach, Fla.

[73] Assignee: Sony Corporation of America, Park Ridge, N.J.

[21] Appl. No.: 794,033

[22] Filed: Nov. 19, 1991

[51] Int. Cl.$^5$ .............................................. H04B 1/00

[52] U.S. Cl. .................................... 381/119; 381/109

[58] Field of Search ........................ 381/119, 123, 109

[56] References Cited

U.S. PATENT DOCUMENTS 4,496,997 1/1985 Ohtsuki .
4,706,294 11/1987 Ouchida .............................. 381/109
4,879,751 11/1989 Franks et al. .
5,054,077 10/1991 Suzuki ................................ 381/119
5,060,272 10/1991 Suzuki ................................ 381/109
5,072,645 12/1991 Rosson ............................... 381/118

FOREIGN PATENT DOCUMENTS 58-50682 3/1983 Japan .

*Primary Examiner*—Forester W. Isen
*Attorney, Agent, or Firm*—Ronald P. Kananen

[57] ABSTRACT

An apparatus for implementing fader channel assignments in an audio mixing console is disclosed. The apparatus minimizes the number of switches necessary to implement a channel assignment function and increases the convenience of location of the keys necessary for implementing a channel assignment without substantially affecting the location of other keys. The invention is particularly useful with slide-type faders which may be used to serve the dual function of fader control in one mode of operation and a channel assignment in another mode of operation.

6 Claims, 2 Drawing Sheets

FADER CHANNEL ASSIGNMENT

FIELD OF THE INVENTION

The present invention relates to an apparatus for implementing fader channel assignments in an audio mixing console.

1. Cross Reference to Related Applications

Reference is made to Ser. No. 07/672,659 entitled "Cross Fader For Editing Audio Signals" submitted by Shoda et al., assigned to Sony Corporation, the parent of the assignee of the present invention.

2. Background of the Invention

In the prior art, fader channel assignments for audio mixing consoles were typically performed by an array of switches located at the top of each module or in another location of the console. Therefore, when an operator desired to perform a channel assignment, he had to reach for these assignment switches to perform the assignment. Depending on the location of these switches on the console, this can be inconvenient and time consuming. Also, typically, an assignment keypad is used which takes up an amount of space on the console. Since console space is generally at a premium, this is obviously undesirable.

For example, in U.S. Pat. No. 4,879,751 issued to Franks et al., it is disclosed, e.g., at Column 4, line 4, that different configurations of the functions carried out by the console or input signals can be memorized, so that the console may be changed rapidly from one configuration to another as the console is set up for different jobs. At Column 4, line 29, it is stated that the common control may also be used to select which of a plurality of buslines of the output bus a given module is connected to. At Column 7, lines 42–52, it is disclosed that a Routing Keyboard (RK) represents the various channel switches of a conventional console and that a plurality of buttons (1 to 48) allows individual selection of 48 output busses. This selection is enabled in conjunction with a Module Control Keyboard (MCK). Beginning at Column 9, line 57, it is disclosed that the Module Assign Keyboard (MAK) enables various master console setup functions. An INT (LOCAL) function is used to assign any channel from the central keyboard area. When this function is selected, a channel display flashes with the letters CH. At this point, a computer is waiting for a two digit entry from the numeric section of a MEMORY FUNCTION and NUMERIC KEYBOARD (MFNK). When the number is entered, the computer interrogates the channel which has been selected and illuminates a long horizontal LED behind the selected channel to indicate the channel number on the central display, and the MCK and RK display the functions selected on that channel.

While the implementation of channel assignment in Franks' device has certain advantages over c'her prior art schemes, it has various drawbacks which are undesirable. For example, separate switches are required for selecting the channel. For example, the arrow to the left and arrow to the right keys are needed on the MAK keyboard and various other keys are used to implement this feature. Since the space available on a console is limited, it is desirable wherever possible to reduce the number of keys that are needed to implement various functions but yet still be able to provide all of the desired functions. Moreover, in some cases, the use of separate keys or keypads for implementing a function necessitates that the keypad be located at a portion of a console which requires the user to reach for it due to its location. This is another drawback.

SUMMARY OF THE INVENTION

It is therefore an object of the present invention to overcome these and other drawbacks of the prior art.

Specifically, it is an object of the present invention to minimize the number of switches necessary to implement a channel assignment function.

It is a further object of the present invention to maximize the convenience of location of the keys necessary for implementing a channel assignment function without substantially affecting the location of other keys.

It is a further object of the present invention to provide a slide-type fader and a function key associated therewith to enable the fader to be used for both fader control in one mode of operation and to select a channel assignment in another mode of operation.

According to the present invention, there is provided a slide-type channel fader operable in a first mode to implement channel fading operations and operable in a second mode to implement channel assignment functions. A mode and preferably a set button are associated with the fader. Depending upon the state of the mode button, the fader would act in either the fader function or channel assignment function.

DETAILED DESCRIPTION OF THE PREFERRED EMBODIMENT

Figure 1:
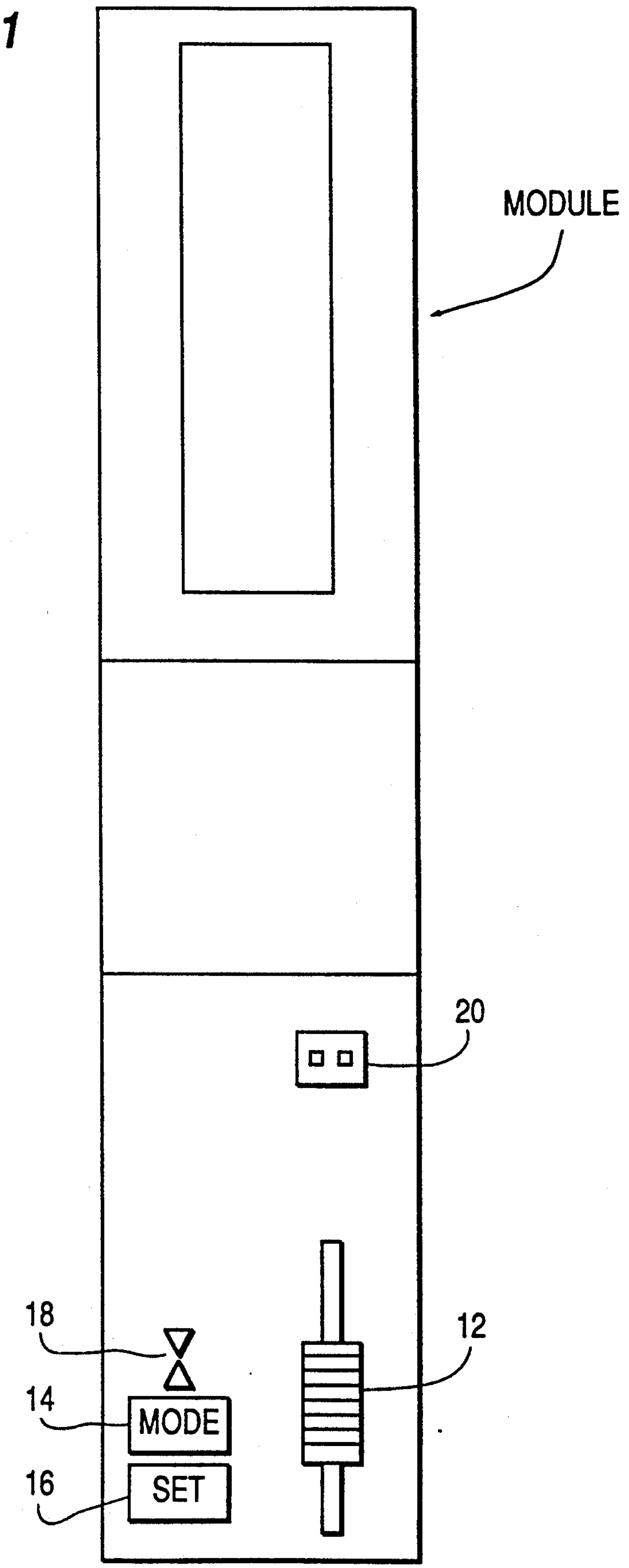
FIG. 1 illustrates a module which may be used according to the present invention.

The present invention may be used to control, for example, a 24 or 48 bus structure in a mixing console. According to one embodiment of the present invention as shown in FIG. 1, there is provided, for each module, a slide-type channel fader 12. A mode switch 14 is also provided to select between at least two modes of operation as will be discussed more fully below. A set button 16 is also provided and is used, at least in the channel assignment mode, to select a desired channel. Optionally, two null LED's 18 may be provided and may be illuminated when the fader is in the channel assignment mode to indicate the fader level position and to facilitate relocating the previous fader level position upon exiting the channel assignment mode.

The module further comprises a display 20 and an LED display which provides an efficient method of scanning the channels that have been assigned, and under a global control, to indicate what channels are assigned thereto. The two digit display 20 serves at least two functions. During normal use (not during channel assignment), the display 20 indicates the present channel. During the channel assignment mode, the display 20 is used to display the channel corresponding to the position of the fader which has been selected by showing a numerical display of the selected channel.

According to one embodiment of the invention, a channel selection or assignment routine may be executed as follows. First, assuming the fader is in a mode other than the channel assignment mode, the mode switch 14 is activated to cause the fader to be operated in the channel assignment mode. Preferably, entering the channel assignment mode will also cause the channel output to be muted. Next, the fader can be quickly and conveniently moved to the desired channel by moving the channel fader 12 either up or down while watching the channel number displayed by display 20. When the desired channel is displayed, the set switch 16 is activated to set the currently displayed channel and to thereby program the matrix and latch the LED located at the top of the module. After completion of the channel assignment, the channel fader 12 may be moved to a position corresponding to a fader level previously set as indicated when the null LED's 18 are both illuminated. The mode switch 14 is then activated to exit the channel assignment mode and return to a previous mode.

According to the invention, a channel deassignment may be executed as follows. First, the mode switch 14 is manipulated, as necessary, to enter the channel assignment mode. Then the channel fader 12 would be moved to a desired channel. A previously assigned channel would be indicated by the flashing of the LED associated with the particular channel. Upon reaching the channel, the set button is pressed. This deassigns the channel. Additionally, under global control, a master clear switch can be selected to clear all previous channel assignments.

Figure 2:
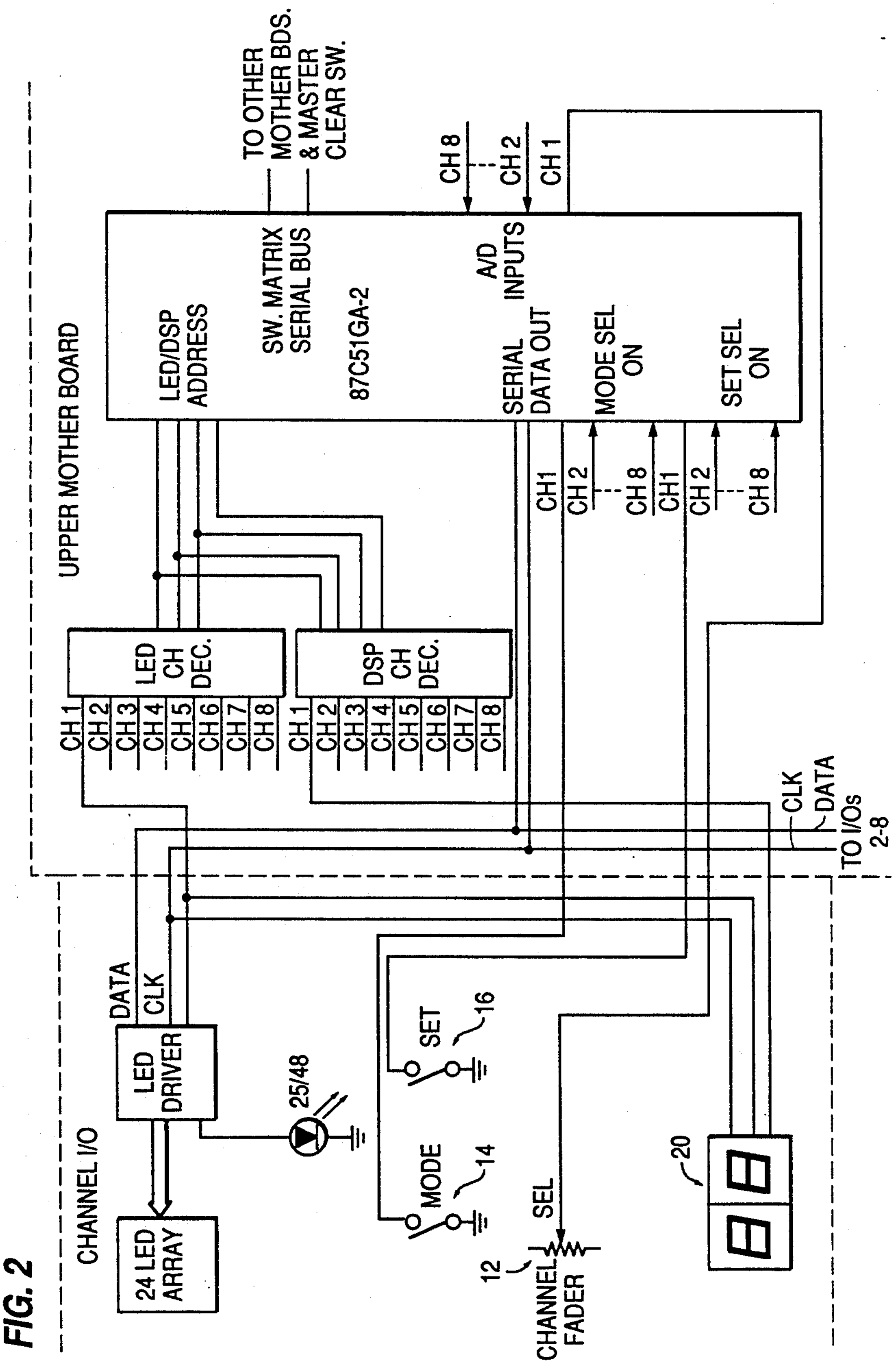
FIG. 2 is a schematic circuit diagram corresponding to the elements in FIG. 1 according to one embodiment of the present invention.

According to a preferred embodiment, the fader channel assignment technique may be implemented by using, e.g., an 87C51GA-2 microcontroller configured as shown in FIG. 2. The system may include one microcontroller per motherboard operating eight I/O's. All LED's and displays may be driven serially and only during a change. All other inputs into the device may be served by approximately three lines, i.e., set select, mode select and fader voltage. A full duplex serial bus may connect to all motherboards. This bus will preferably send data to a central processing board to drive a FET Matrix device for summing. Likewise, under a master control, data could be sent to all I/O's to setup previous assignments o to indicate what channels are assigned to itself. This information is preferably stored in a non-volatile memory.

Since the microcontroller is preferably provided with built-in ROM, RAM, A/D's and three 8 bit I/O's, limited support circuitry is required. The 87C51 can operate at 500 Khz and, under software control, can be put into an idle mode during non-assignment conditions.

The I/O module preferably includes two switches (MODE and SET), a two digit display and a 24 LED array for a 24 bus structure. Decoder circuitry for the discrete LED's and a FET switching circuit may also be provided.

Preferably, the null LED's may be controlled from the microcontroller using the 8 bit A/D's to memorize fader locations. This would eliminate the need for a VCA in the channel.

I claim:

1. A multi-channel mixing apparatus comprising:

fader means for fading signal levels;

assignment means for performing fader channel assignments to assign said fader means to desired channels of the multi-channel mixing apparatus;

fader mode selection means for selectively enabling said fader means to be active in at least a normal mode or a channel assignment mode; and display means for displaying a channel associated with said fader means, wherein in said channel assignment mode, said fader means is operable to cause said display to display a desired channel to thereby enable selection of a channel assignment for said fader, and implementation means, operable upon selection of the desired channel, for implementing a channel assignment of said desired channel to said fader means.

2. The apparatus of claim 1 wherein said fade means comprises a plurality of faders and said mode selection means comprises a corresponding plurality of mode selection buttons.

3. The apparatus of claim 1 wherein said implementation means comprises a set button.

4. The apparatus of claim 1 wherein said display means comprises a multi-digit display for displaying a channel number associated with the position of said fader means during the assignment mode, and for displaying said channel assignment during said normal mode.

5. The apparatus of claim 1, further comprising indicating means for enabling said fader means to be returned to a position said fader means held in said normal mode.

6. The apparatus of claim 1, wherein said indicating means comprises a pair of LEDs for indicating when said fader means is placed in said position.

* * * * *